Patented Mar. 29, 1932

1,851,119

UNITED STATES PATENT OFFICE

FRITZ STRAUB, OF BASEL, AND WALTER HANHART, OF RIEHEN, NEAR BASEL, SWITZERLAND, ASSIGNORS TO THE FIRM OF SOCIETY OF CHEMICAL INDUSTRY IN BASLE, OF BASEL, SWITZERLAND

METALLIFEROUS DYESTUFFS AND PROCESS OF MAKING SAME

No Drawing. Application filed June 16, 1930, Serial No. 461,624, and in Switzerland June 20, 1929.

The present invention relates to the manufacture of new metalliferous dyestuffs. It comprises the process of making these dyestuffs, the new dyestuffs themselves, and the material that has been dyed with the new products.

According to this invention new metalliferous dyestuffs are obtained by treating with agents yielding metals capable of forming lakes disazo-dyestuffs of the general formula

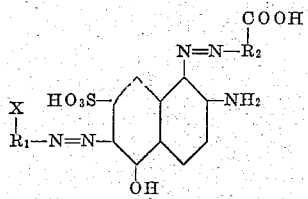

in which $R_1$ and $R_2$ are aryl residues which may contain substituents, and $x$ is such a group in ortho-position to the —N=N— bridge which, in combination with this —N=N— bridge, renders the dyestuff adapted to bind metals capable of forming lakes.

The new dyestuffs may contain one or more metals. The metallization may occur in acid, neutral or alkaline medium, with or without application of pressure, and in presence or absence of suitable additions.

The metalliferous dyestuffs of the invention dye cotton, and particularly artificial silk derived from regenerated cellulose, such as striped viscose, uniform and fast tints.

The following examples illustrate the invention, the parts being by weight:—

Example 1

5.7 parts of the disazo-dyestuff of the formula

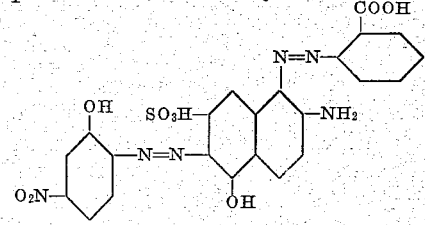

obtainable by coupling diazotized anthranilic acid in an acid medium with 2-amino-5-hydroxy-naphthalene-7-sulfonic acid and causing the monoazo-dyestuff thus produced to react with diazotized 5-nitro-2-amino-1-phenol in alkaline medium, are dissolved in 600 parts of water and to the solution are added 8.4 parts of crystallized sodium acetate and 3 parts of $Cr_2O_3$ in the form of a solution of chromium fluoride of about 4 per cent. strength. The whole is then boiled in a reflux apparatus until chroming is complete. The color of the solution changes from red to blue. The solution is filtered if necessary, and the dyestuff separated from the filtrate in the usual manner. When dry it is a blackish powder which dissolves in water to a blue solution and in concentrated sulfuric acid to a violet solution. It dyes viscose grey-blue tints characterized by their uniformity.

The chromium compound of the corresponding dyestuff from diazotized 4-nitro-2-amino-1-phenol-6-sulfonic acid is a blackish powder which dissolves in water to a blue solution and in concentrated sulfuric acid to a violet solution. It dyes viscose uniform blue grey tints. The chromium compound from the corresponding dyestuff from diazotized 4-chloro-5-nitro-2-amino-1-phenol is a blackish powder which dissolves in water to a blue solution and in concentrated sulfuric acid to a violet solution. It dyes viscose uniform, powerful greenish-grey tints.

The metalliferous dyestuffs derived from diazotized 4-chloro-2-amino-1-phenol or 4-chloro-2-amino-1-phenol-6-sulfonic acid have similar properties.

Example 2

6.8 parts of the sodium salt of the dyestuff of the formula

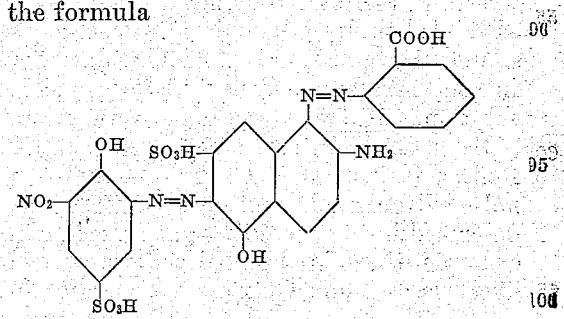

from diazotized 6-nitro-2-amino-1-phenol-4-sulfonic acid and the monoazo-dyestuff obtainable by the acid coupling of diazotized anthranilic acid with 2-amino-5-hydroxynaphthalene-7-sulfonic acid are dissolved in 600 parts of water and after addition of a chromium fluoride solution, corresponding with 3 parts of $Cr_2O_3$, the solution is boiled for a long time in a reflux apparatus. The color of the solution soon changes from red to blue. The solution is filtered, if necessary, and the dyestuff obtained by evaporating the filtrate. It is a dark powder soluble in water to a blue solution and in concentrated sulfuric acid to a red violet solution. It dyes viscose uniform grey-blue tints.

By substituting for the 6-nitro-2-amino-1-phenol-4-sulfonic acid the corresponding 4-nitro-2-amino-1-phenol-6-sulfonic acid and operating for the rest in the manner described in the preceding paragraph of this example, there is obtained a dyestuff having similar properties.

*Example 3*

6.8 parts of the sodium salt of the dyestuff of the formula

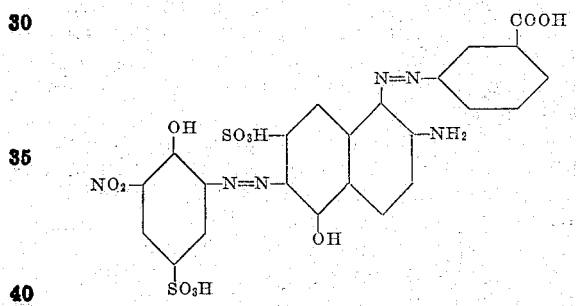

made from diazotized 6-nitro-2-amino-1-phenol-4-sulfonic acid and the dyestuff from diazotized meta-aminobenzoic acid and 2-amino-5-hydroxynaphthalene-7-sulfonic acid (acid coupling) are dissolved in 600 parts of water and after addition of a chromium fluoride solution, corresponding with 3 parts of $Cr_2O_3$, the solution is boiled in a reflux apparatus until the chromium compound has been formed. The color of the solution becomes violet. The solution is filtered, if necessary, the filtrate is concentrated and the dyestuff precipitated by addition of common salt. When dry it is a dark bronze powder, soluble in water to a blue violet solution and in concentrated sulfuric acid to a blue-grey solution. It dyes viscose neutral grey tints.

By using 4-nitro-2-amino-1-phenol-6-sulfonic acid instead of 6-nitro-2-amino-1-phenol-4-sulfonic acid and operating exactly as described in the preceding paragraph of this example, there is obtained a dyestuff which dyes viscose somewhat more red grey tints. It dissolves in water to a dull violet solution and in concentrated sulfuric acid to a dirty grey solution.

The chromium compounds of the corresponding dyestuffs from diazotized 4-chloro-2-amino-1-phenol-6-sulfonic acid or 5-nitro-2-amino-1-phenol are dark powders, soluble in water to a violet solution and a blue-grey solution respectively, and in concentrated sulfuric acid to a dirty violet solution and a dirty blue solution respectively; both dye viscose grey to grey-blue tints.

*Example 4*

6.7 parts of the sodium salt of the disazo-dyestuff of the formula

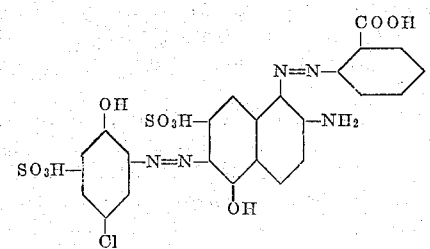

made from diazotized 4-chloro-2-amino-1-phenol-6-sulfonic acid and the dyestuff from diazotized anthranilic acid and 2-amino-5-hydroxynaphthalene-7-sulfonic acid (acid coupling) are dissolved in 500 parts of water and the solution is boiled in a reflux apparatus with 1.2 parts of $NiCl_2$. After addition of 2.2 parts of $Cr_2O_3$ in the form of a chromium fluoride solution, boiling is continued until metallisation is complete. The dyestuff is separated by evaporation and addition of common salt. When dry it is a blackish powder, freely soluble in water to a blue solution and in concentrated sulfuric acid to a violet solution. It dyes viscose uniform grey tints.

*Example 5*

6.8 parts of the sodium salt of the disazo-dyestuff defined in the beginning of Example 2, are dissolved in 200 parts of water and after addition of some ammonia the solution is treated for a short time with 1.25 parts of $CuSO_4$ in the form of an ammoniacal copper oxide solution. The dyestuff is separated by addition of acetic acid. It is dissolved in 600 parts of water and after addition of 2.2 parts of $Cr_2O_3$ in the form of a chromium fluoride solution the whole is boiled in a reflux apparatus until chroming is complete. The dyestuff, if necessary after concentration, is salted out. It is a dark powder, soluble in water to a violet solution and in concentrated sulfuric acid to a red violet solution. It dyes viscose uniform grey violet tints.

Example 6

6.7 parts of the sodium salt of the disazo-dyestuff of the formula

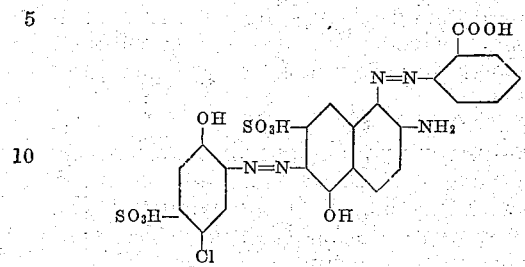

made from diazotized 4-chloro-2-amino-1-phenol-5-sulfonic acid and the dyestuff from diazotized anthranilic acid and 2-amino-5-hydroxynaphthalene-7-sulfonic acid (acid coupling) are coppered as described in Example 5 by means of $CuSO_4$ and then chromed as described in that example. The dyestuff separated by salting out after concentration is a dark powder, soluble in water to a violet solution and in concentrated sulfuric acid to a red violet solution. It dyes viscose grey tints.

Example 7

5.7 parts of the disazo-dyestuff defined at the beginning of Example 1 are dissolved in 600 parts of water and chromed in a reflux apparatus by means of 0.2 part of $Cr_2O_3$ in the form of a chromium fluoride solution and 0.5 part of crystallized sodium acetate. The chromed dyestuff is then coppered by means of 2.5 parts of $CuSO_4$. The dyestuff thus obtained is separated in the usual manner. It is a dark powder, soluble in water to a violet solution and in concentrated sulfuric acid to a blue solution. It dyes viscose grey tints.

When the parent dyestuff is chromed by means of 0.4 part of $Cr_2O_3$ in the form of a chromium fluoride solution, and then coppered by means of copper sulfate, an analogous product is obtained which dissolves in water to a violet solution and in concentrated sulfuric acid to a blue violet solution. It dyes viscose uniform grey violet tints.

If in contrast with the first paragraph of this example, the disazo-dyestuff is first coppered by means of 0.8 part of $CuSO_4$, and after addition of 8.4 parts of crystallized sodium acetate is chromed by means of 3 parts of $Cr_2O_3$ in the form of a chromium fluoride solution, there is obtained a dyestuff containing chromium and copper which dissolves in water to a violet solution and in concentrated sulfuric acid to a red violet solution. It dyes viscose grey tints.

What we claim is:—

1. Process for the manufacture of metalliferous dyestuffs, consisting in treating with agents yielding metals capable of forming lakes with the lake-forming groups of the dyestuffs, disazo-dyestuffs of the general formula

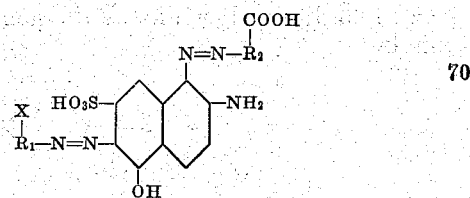

wherein $R_1$ and $R_2$ are benzene radicles and $x$ is a lake-forming group in ortho-position to the $-N=N-$ bridge.

2. Process for the manufacture of metalliferous dyestuffs, consisting in treating with agents yielding metals capable of forming lakes with the lake-forming groups of the dyestuffs, disazo-dyestuffs of the general formula

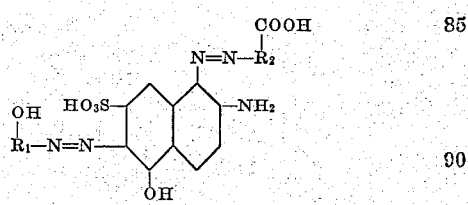

wherein $R_1$ and $R_2$ are benzene radicles, and the OH-group of the benzene radicle $R_1$ is in ortho-position to the $-N=N-$ bridge.

3. Process for the manufacture of metalliferous dyestuffs, consisting in treating with agents yielding metals of the atomic weight 27 to 66 capable of forming lakes with the lake-forming groups of the dyestuffs, disazo-dyestuffs of the general formula

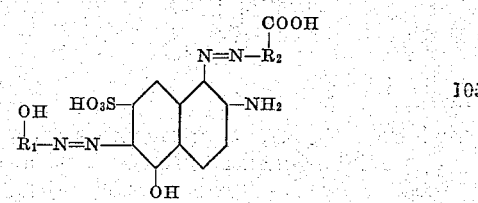

wherein $R_1$ and $R_2$ are benzene radicles, and the OH-group of the benzene radicle $R_1$ is in ortho-position to the $-N=N-$ bridge.

4. Process for the manufacture of metalliferous dyestuffs, consisting in treating with agents yielding metals of the atomic weight 52 to 66 disazo-dyestuffs of the general formula

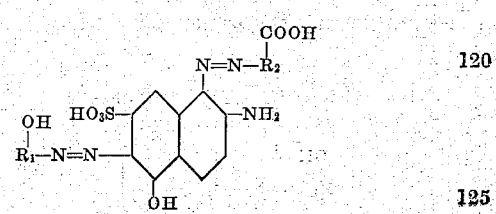

wherein $R_1$ and $R_2$ are benzene radicles, and the OH-group of the benzene radicle $R_1$ is in ortho-position to the $-N=N-$ bridge.

5. Process for the manufacture of metalliferous dyestuffs, consisting in treating with agents yielding metals of the atomic weight 52 to 66 disazo-dyestuffs of the general formula

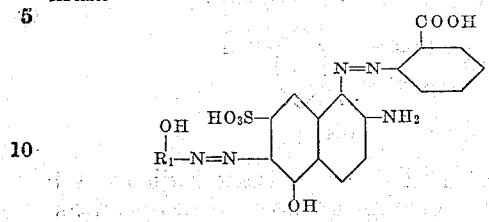

wherein $R_1$ is a benzene radicle, and the OH-group of the benzene radicle $R_1$ is in ortho-position to the —N=N— bridge.

6. Process for the manufacture of a chromiferous dyestuff, consisting in treating the disazo-dyestuff of the formula

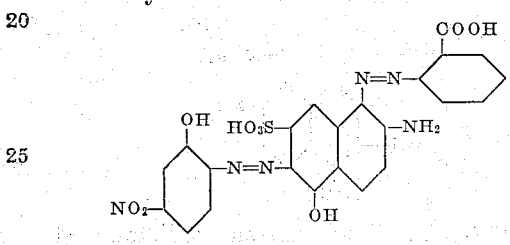

with chromium.

7. As new products the metalliferous disazo-dyestuffs which disazo-dyestuffs correspond with the general formula

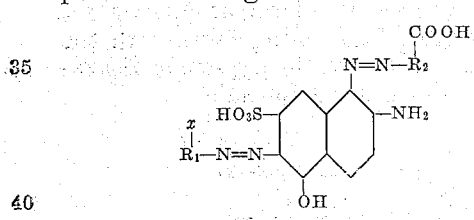

wherein $R_1$ and $R_2$ are benzene radicles, and $x$ is a lake-forming group in ortho-position to the —N=N— bridge, which products form blackish to dark to bronze powders which dissolve in water to violet to blue to blue-grey solutions, in concentrated sulfuric acid to red to violet to blue to grey solutions, dyeing cotton and artificial silk derived from regenerated cellulose grey-violet to grey-blue to greenish-grey to grey tints.

8. As new products the metalliferous disazo-dyestuffs which disazo-dyestuffs correspond with the general formula

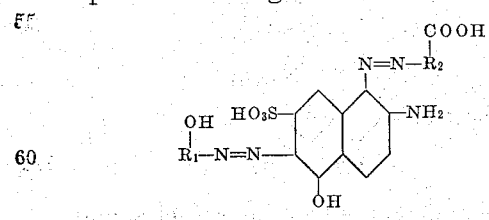

wherein $R_1$ and $R_2$ are benzene radicles, and the OH-group of the benzene radicle $R_1$ stands in ortho-position to the —N=N— bridge which products form blackish to dark to bronze powders which dissolve in water to violet to blue to blue-grey solutions, in concentrated sulfuric acid to red to violet to blue to grey solutions, dyeing cotton and artificial silk derived from regenerated cellulose grey-violet to grey-blue to greenish-grey tints.

9. As new products the metalliferous disazo-dyestuffs which contain metals of the atomic weight 27 to 66 capable of forming lakes with the lake-forming groups of the dyestuffs, which disazo-dyestuffs correspond with the general formula

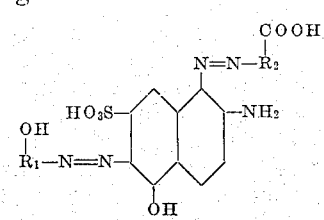

wherein $R_1$ and $R_2$ are benzene radicles and the OH-group of the benzene radicle $R_1$ stands in ortho-position to the —N=N— bridge, which products form blackish to dark to bronze powders which dissolve in water to violet to blue to blue-grey solutions, in concentrated sulfuric acid to red to violet to blue to grey solutions, dyeing cotton and artificial silk derived from regenerated cellulose grey-violet to grey-blue to greenish-grey to grey tints.

10. As new products the metalliferous disazo-dyestuffs which contain metals of the atomic weight 52 to 56 capable of forming lakes with the lake-forming groups of the dyestuffs, which disazo-dyestuffs correspond with the general formula

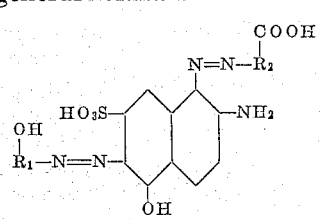

wherein $R_1$ and $R_2$ are benzene radicles and the OH-group of the benzene radicle $R_1$ stands in ortho-position to the —N=N— bridge, which products form blackish to dark to bronze powders which dissolve in water to violet to blue to blue-grey solutions, in concentrated sulfuric acid to red to violet to blue to grey solutions, dyeing cotton and artificial silk derived from regenerated cellulose grey-violet to grey-blue to greenish-grey to grey tints.

11. As new products the metalliferous disazo-dyestuffs which contain metals of the atomic weight 52 to 56 capable of forming lakes with the lake-forming groups of the dyestuffs, which disazo-dyestuffs correspond with the general formula

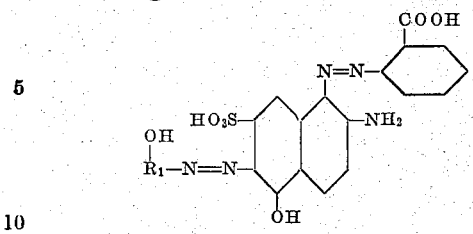

wherein $R_1$ is a benzene radicle and the OH-group of the benzene radicle $R_1$ stands in ortho-position to the —N=N— bridge, which products form blackish to dark powders which dissolve in water to violet to blue solutions, in concentrated sulfuric acid to red to violet to blue solutions, dyeing cotton and artificial silk derived from regenerated cellulose grey-violet to grey-blue to greenish-grey to grey tints.

12. As a new product the chromiferous disazo-dyestuff which disazo-dyestuff corresponds with the formula

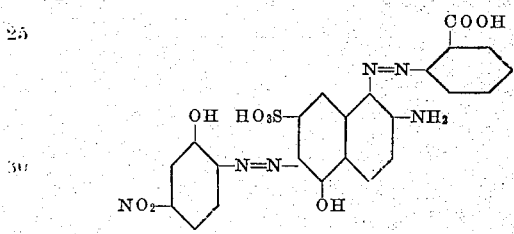

which product forms a blackish powder which dissolves in water to a blue solution, in concentrated sulfuric acid to a violet solution, dyeing cotton and artificial silk derived from regenerated cellulose grey-blue tints.

In witness whereof we have hereunto signed our names this 5th day of June, 1930.

FRITZ STRAUB.
WALTER HANHART.